(12) United States Patent
Jung

(10) Patent No.: US 8,433,370 B2
(45) Date of Patent: Apr. 30, 2013

(54) MOBILE TERMINAL AND CONTROLLING METHOD THEREOF

(75) Inventor: Eunsoo Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 156 days.

(21) Appl. No.: 13/013,699

(22) Filed: Jan. 25, 2011

(65) Prior Publication Data

US 2012/0015672 A1 Jan. 19, 2012

(30) Foreign Application Priority Data

Jul. 19, 2010 (KR) .................. 10-2010-0069512

(51) Int. Cl.
*H04B 1/38* (2006.01)

(52) U.S. Cl.
USPC ............ 455/566; 455/414.1; 455/456.1; 455/456.2; 455/456.3; 455/456.5; 455/456.6; 455/457; 345/156; 345/629; 345/632; 345/633

(58) Field of Classification Search .......... 455/414.1, 455/456.1–456.3, 456.5–457, 550.1, 566, 455/414.2; 345/156, 629, 632, 633
See application file for complete search history.

(56) References Cited

U.S. PATENT DOCUMENTS

| | | | |
|---|---|---|---|
| 8,106,856 B2 * | 1/2012 | Matas et al. .................. 345/73 |
| 8,180,396 B2 * | 5/2012 | Athsani et al. ................ 455/557 |
| 8,207,843 B2 * | 6/2012 | Huston .................... 340/539.13 |
| 2009/0215471 A1 | 8/2009 | Sands et al. | |
| 2009/0319181 A1 | 12/2009 | Khosravy et al. | |
| 2010/0035637 A1 * | 2/2010 | Varanasi et al. .............. 455/457 |
| 2010/0125407 A1 | 5/2010 | Cho et al. | |
| 2010/0130236 A1 * | 5/2010 | Sivadas et al. ............ 455/456.6 |
| 2010/0328344 A1 * | 12/2010 | Mattila et al. ................. 345/633 |
| 2011/0209201 A1 * | 8/2011 | Chollat ............................. 726/4 |
| 2011/0217962 A1 * | 9/2011 | Leung ........................ 455/414.2 |
| 2011/0292076 A1 * | 12/2011 | Wither et al. ................. 345/632 |
| 2012/0001939 A1 * | 1/2012 | Sandberg ..................... 345/633 |

* cited by examiner

*Primary Examiner* — Olumide T Ajibade Akonai
(74) *Attorney, Agent, or Firm* — Lee, Hong, Degerman, Kang & Waimey

(57) ABSTRACT

A mobile terminal and controlling method thereof are disclosed, by which object information on an object in a preview image is held in the preview image to be utilized in various ways. The present invention includes displaying a preview image photographed via a camera, obtaining a current position of the mobile terminal, searching object information on at least one object in the preview image based on the current position of the mobile terminal, displaying the found object information within the preview image, if the displayed the object information is selected from the preview image, holding the selected object information within the preview image, and controlling an operation related to the held object information.

20 Claims, 22 Drawing Sheets

(a)

(b)

(a)

(b)

(a)

(b)

(c)

(a)

(b)

(c)

(a)

(b)

(c)

(a)

(b)

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2010-0069512, filed on Jul. 19, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a mobile terminal is equipped with an augmented reality (hereinafter abbreviated AR) function of providing information on an object located within a preview image of a camera.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which object information on an object within a preview image is held within the preview image.

Another object of the present invention is to provide a mobile terminal and controlling method thereof, by which the held object information can be utilized in various ways.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a wireless communication unit, a camera configured to photograph a preview image, a position information unit configured to obtain a current position of the mobile terminal, a touchscreen displaying the preview image photographed via the camera, and a controller searching and displaying object information on at least one object in the preview image based on the current position of the mobile terminal, the controller, if the object information is selected, holding the selected object information within the preview image, the controller controlling an operation related to the held object information.

In another aspect of the present invention, a method of controlling a mobile terminal according to the present invention includes the steps of displaying a preview image photographed via a camera, obtaining a current position of the mobile terminal, searching object information on at least one object in the preview image based on the current position of the mobile terminal, displaying the found object information within the preview image, if the displayed the object information is selected from the preview image, holding the selected object information within the preview image, and controlling an operation related to the held object information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4(a) to 6(b) are diagrams of screen configurations of a process for holding object information within a preview image according to the present invention;

FIGS. 9(a) to 10(b) are diagrams of screen configurations of a process for searching and displaying an object information related to a held object information among objects within a preview image according to a third embodiment of the present invention;

FIGS. 11(a) to 14(c) are diagrams of screen configurations of a process for editing a held object information according to a fourth embodiment of the present invention;

FIGS. 20(a) to 22(c) are diagrams of screen configurations of a process for transmitting a held object information to a counterpart contact address according to a tenth embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
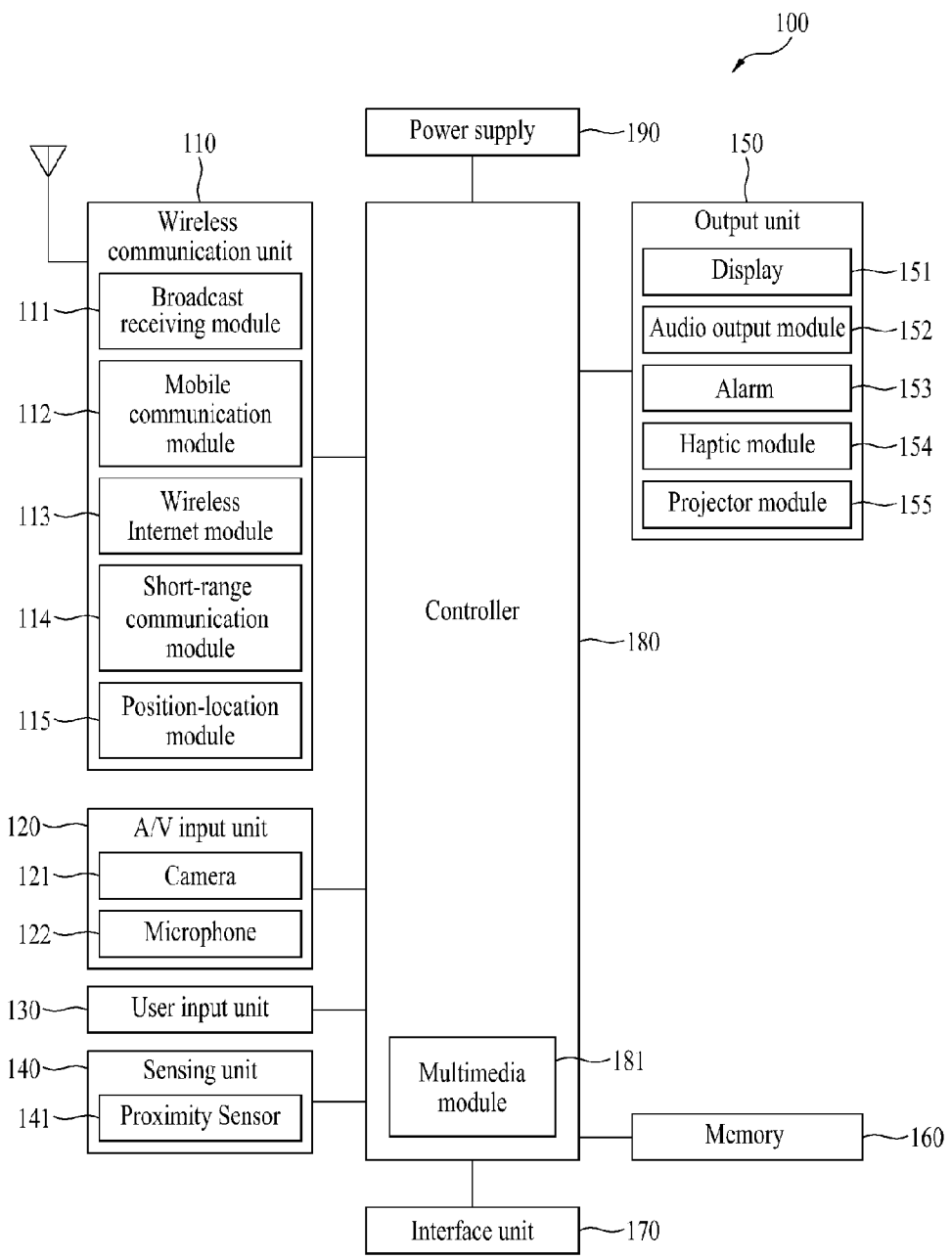
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

Moreover, the mobile communication module 112 transmits current position information of the mobile terminal obtained via a position-location module 115, which will be described later, to an external server (not shown in the drawing) and is then able to receive or download data relevant to an area, in which the mobile terminal 100 is located, from the external server.

In this case, detailed map data of the area can be included in the data as well as an image representing the area where the mobile terminal 100 is located.

Moreover, an object information database relevant to objects located within a specific radius of the area can be included in the map data. In this case, the objects can include buildings and the like for example. And, the objects can include hospital, restaurant, toilet, police station, community center and the like, which are located within the buildings.

A real image of each area, position information of objects included within the real image and detailed information on the objects are included in the map data.

In this case, the real image can include an image having the same view of a preview image inputted via the camera 121 or an image corresponding to a sky view.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

Moreover, as mentioned in the foregoing description, the wireless internet module 113 can receive or download the data relevant to the area, in which the mobile terminal 100 is located, from the external server.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Moreover, as mentioned in the foregoing description, the short-range communication module 114 is able to receive or download the data relevant to the area, in which the mobile terminal 100 is located, from the external server of another terminal located in the vicinity of the mobile terminal 100.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122.

The camera 121 possesses a digital zoom and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141 and a motion sensor 142.

The motion sensor 142 detects a body motion of the mobile terminal 100. The motion sensor 142 outputs a signal corresponding to the detected body motion to the controller 180.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

An object information database for object information of objects (e.g., buildings, shops, road signs, etc.), which can be searched using at least one of pattern recognition information related to an object within a preview image photographed via the camera 121 and position information of the mobile terminal 100 obtained via the position-location module 115, can be stored in the memory 160.

In this case, the object information can include at least one of relevant text information (e.g., a name of the building or shop, etc.), relevant link information (e.g., link information of the building or shop), relevant image information (e.g., an image logo of the building or shop, etc.), and relevant audio information (e.g., a log song of the building or shop, etc.) of the pattern-recognized object.

The object information database stored in the memory 160 can be downloaded or updated from a database of the external server via the wireless communication unit 110.

The object information database stored in the memory 160 can include a whole part of the database downloaded from the external server. Alternatively, the object information database stored in the memory 160 can include a portion of the database downloaded in part from the external server in consideration of the storage capacity of the memory 160.

The portion of the database of the external server is provided for an object located within a predetermined distance from a current position of the mobile terminal 100 or an object located in a predetermined area (e.g., administrative district, etc.) related to a current position of the mobile terminal 100.

A plurality of contact informations including a plurality of counterpart video images are stored in the memory 160. In this case, the contact information can include a name, video image, phone number, email address and fax number of a corresponding counterpart and the like.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

Meanwhile, the controller 180 can be configured to implement the augmented reality (hereinafter abbreviated AR) technology. In this case, the augmented reality is a sort of a virtual reality that provides one image generated from combining a real world seen via user's eyes and a virtual world having side information together. In particular, the augmented reality, which conceptionally compensates a real word with a virtual world, plays a role in providing information necessary for the real world graphically in addition. And, the controller 180 is able to display the object information in the form of the augmented reality.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
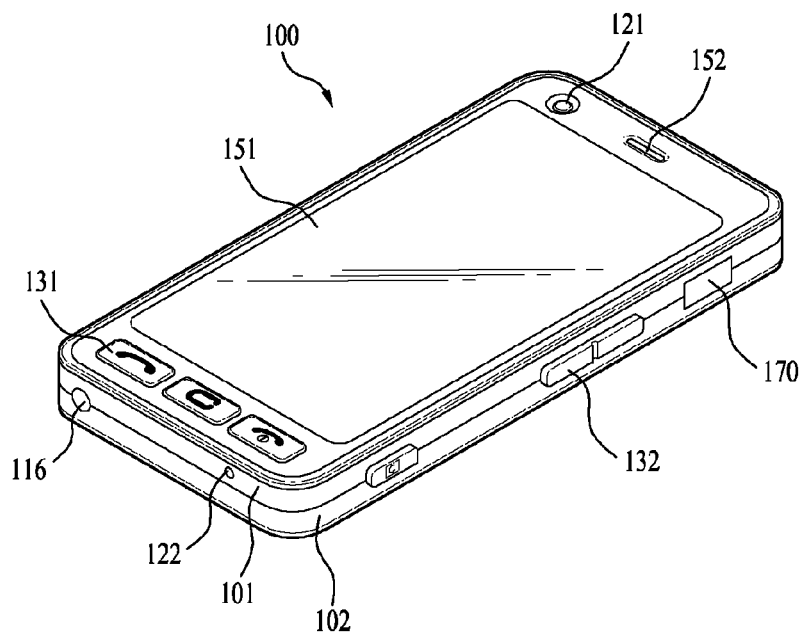
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
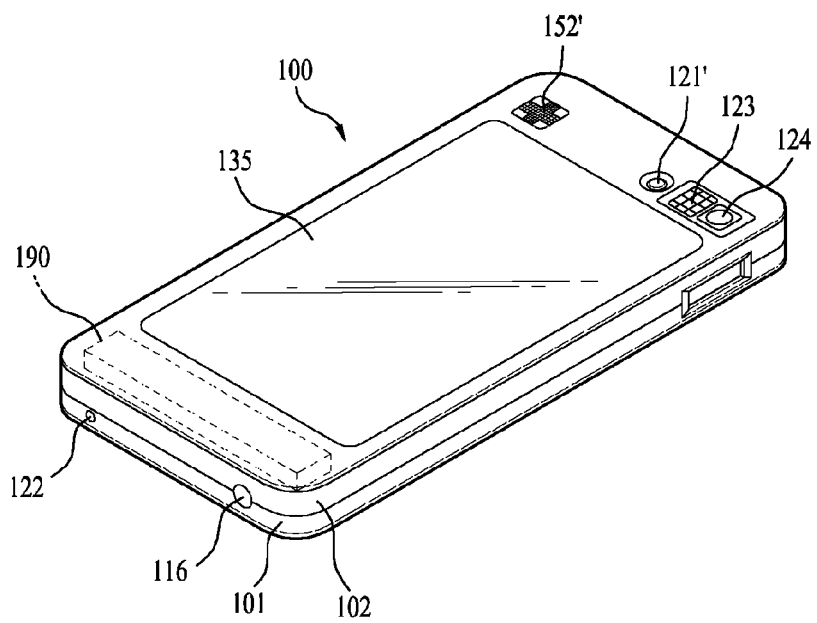
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, a controlling method available for the implementation in the mobile terminal 100 according to embodiments of the present invention are explained with reference to the accompanying drawings.

Figure 3:
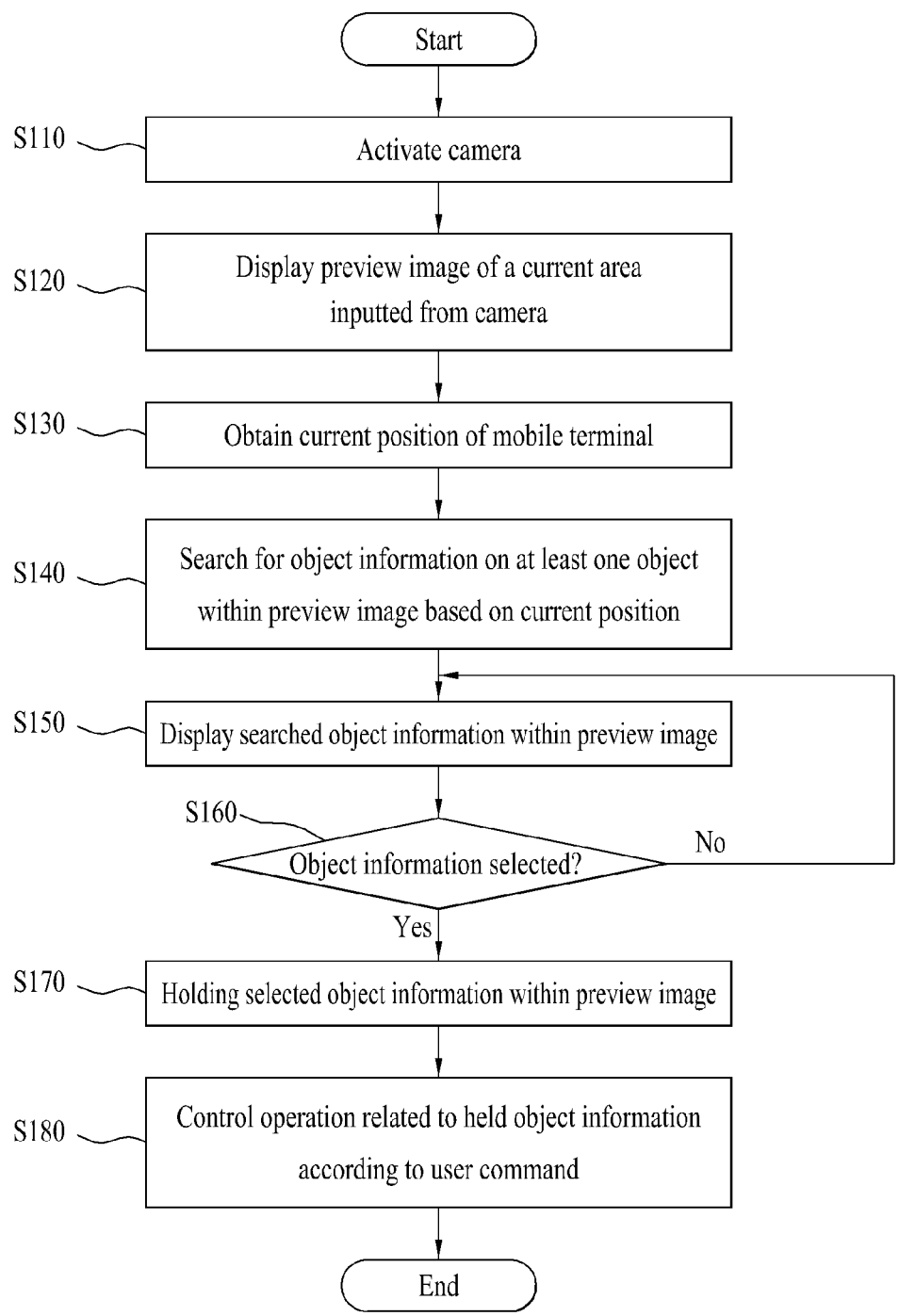
FIG. 3 is a flowchart of a process for holding object information within a preview image and controlling an operation of the held object information according to the present invention.

FIG. 3 is a flowchart of a process for holding object information within a preview image and controlling an operation of the held object information according to the present invention.

Referring to FIG. 3, if a menu function for augmented reality is selected by a user, the controller 180 of the mobile terminal 100 activates the camera 121 [S110] and displays a preview image of a current area inputted via the camera 121 on the touchscreen 151 [S120].

Subsequently, the controller 180 obtains a current position of the mobile terminal 100 via the position-location module 115 [S130]. In particular, the position-location module 115 receives position information including a latitude, longitude, altitude and direction of the mobile terminal 100 and the like from a satellite under the control of the controller 180.

Based on the obtained current position of the mobile terminal 100, the controller 180 searches an object information database in the memory 160 for object information on at least one object existing in the preview image [S140].

The controller 180 recognizes a pattern of the at least one object existing in the preview image and is then able to search the object information database in the memory 160 for the object information corresponding to the recognized pattern.

In this case, the object information includes a name, contact and detailed position of the corresponding object and the like.

As mentioned in the above description, if the object information on the objects existing in the preview image is found from the object information database, the controller 180 displays the found object information at positions of the corresponding objects within the preview image by the augmented reality scheme [S150].

Afterwards, if at least one object information is selected from the displayed object informations [S160], the controller 180 holds the selected object information within the preview image according to the present invention [S170] and then controls an operation related to the held object information according to a user command [S180].

The object information operation controlling process in the step S180 shall be described in detail with reference to FIGS. 7 to 22 later.

Meanwhile, the state of holding the object information means that the controller 180 controls the selected object information to be temporarily stored in the memory and keeps the display of the object information within the preview image until executing an operation control related to the selected object information.

In particular, if a photographing view of the camera 121 is not changed, the held object information keeps being displayed within the preview image. Alternatively, the held object information keeps being displayed within the preview image until the operational control related to the selected object information is executed despite that the photographing view of the camera 121 is has changed.

The held state of the object information is explained in detail with reference to FIGS. 4 to 6 as follows.

Figure 4:
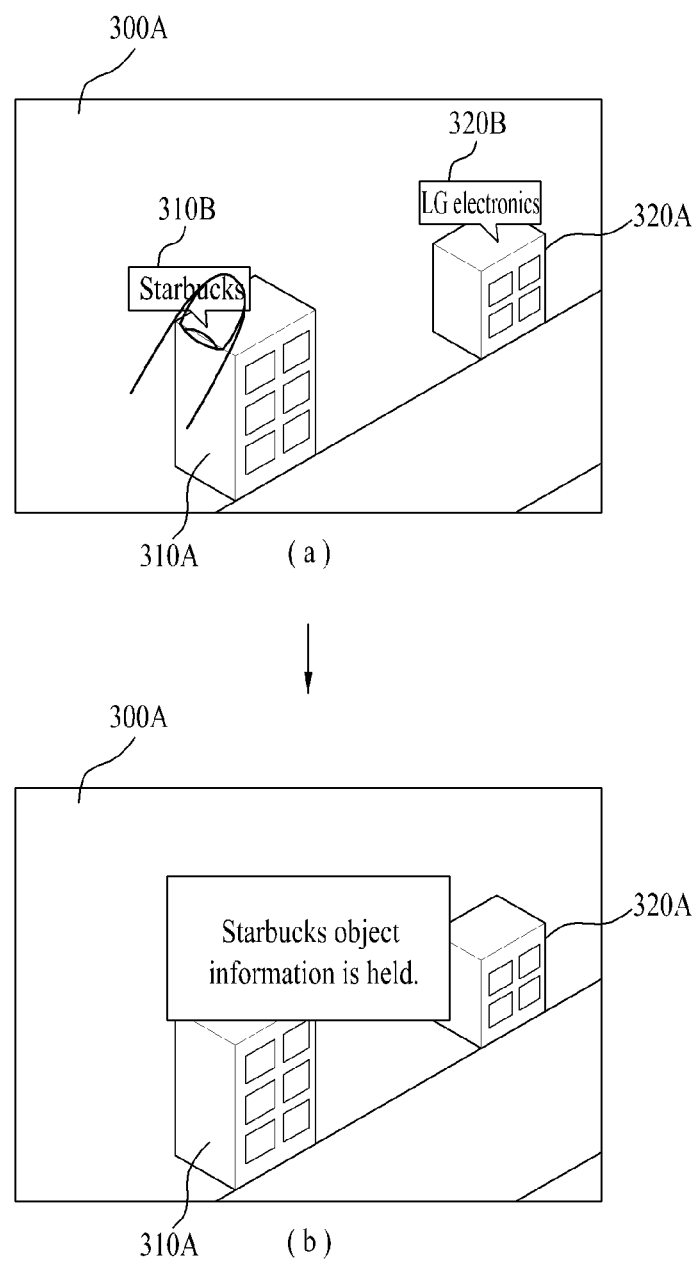
Figure 5:
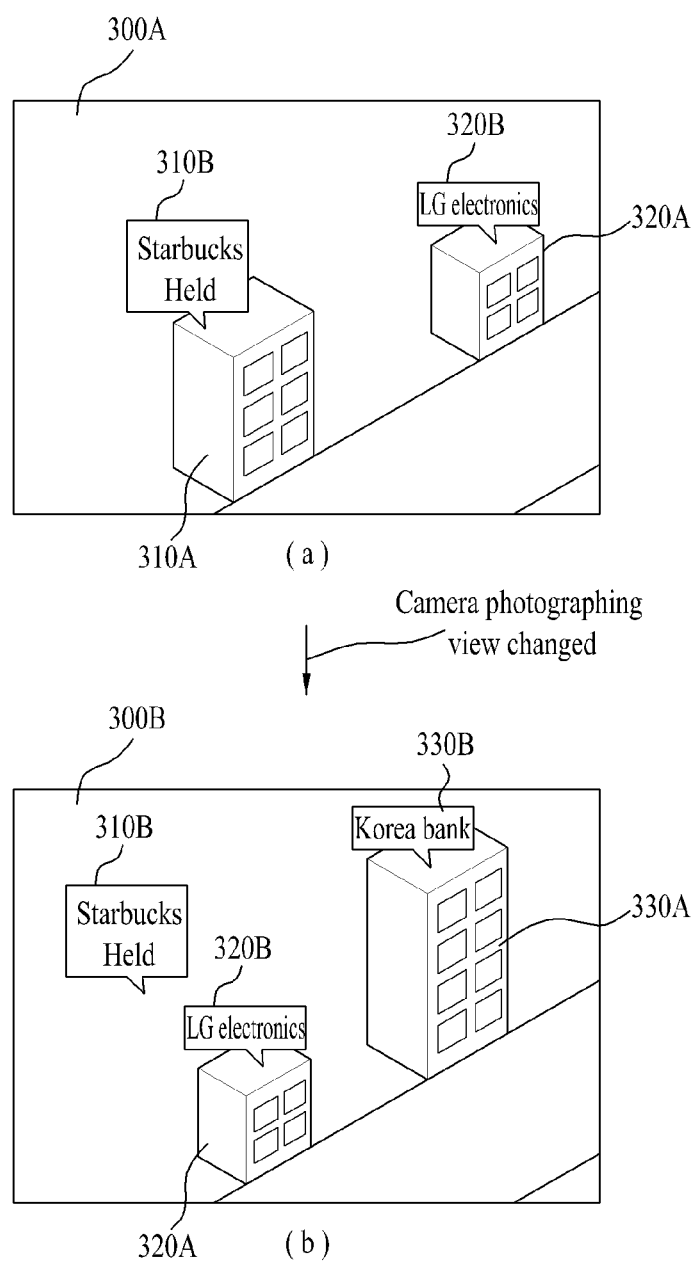
Figure 6:
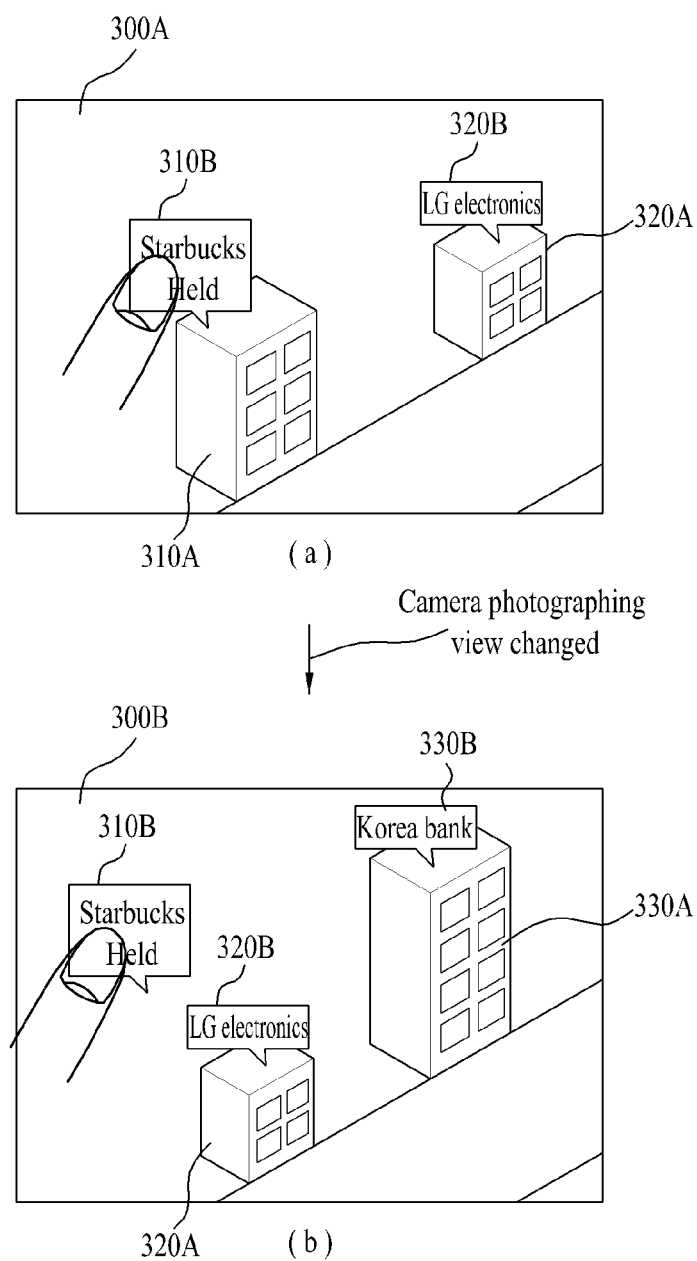

FIGS. 4 to 6 are diagrams of screen configurations of a process for holding object information within a preview image according to the present invention.

Referring to FIG. 4 (*a*), a first object 310A and a second object 320A exist in a first preview image 300A. And, a first object information 310B on the first object 310A and a second object information 320B on the second object are displayed by augmented reality.

If the first object information 310B (Starbucks) is selected from the first preview image 300A, the controller 180 holds the selected first object information 310B (Starbucks) within the first preview 300A [FIG. 4 (*b*)].

Referring to FIG. 5 (*a*), the first object information 310B is held by the process shown in FIG. 4.

While the first object information 310B is held, if a photographing view of the camera 121 is changed, the controller 180 switches the first preview image 300A to a second preview image 300B according to the photographing view change and then displays second and third object informations 320B and 330B on second and third objects 320A and 330A existing in the second preview image 300B, respectively [FIG. 5 (*b*).

In this case, even if the first preview image 300A is switched to the second preview image 300B, the controller 180 keeps displaying the first object information 310B, which is held in the first preview image 300A within the second preview image 300B as well.

Referring to FIG. 6 (*a*), if the first object information 310B is touched by a user, the touched first object information 310 is held.

In this case, referring to FIG. 6, if the touched state of the first object information 310B is continuously maintained, the held state of the first object information 310B is continuously maintained as well.

In particular, after the first object information 310B has been touched, if the state of touching the first object information 310B is continuously maintained, the held state of the first object information 310B continues to be maintained.

Meanwhile, while the first object information 310B is held, if a photographing view of the camera 121 is changed according to a user's touch, as shown in FIG. 6 (*b*), the controller 180 switches the first preview image 300A to the second preview image 300B according to the photographing view change and keeps displaying the first object information 310B, which is held in the first preview image 300A, within the second preview image 300B as well.

In the following description, the process for controlling an operation related to the held object information in the step S180 is explained in detail with reference to FIGS. 7 to 22.

First Embodiment

A first embodiment of the present invention relates to a process for selectively displaying a held object information among a plurality of object informations in a preview image.

Figure 7:
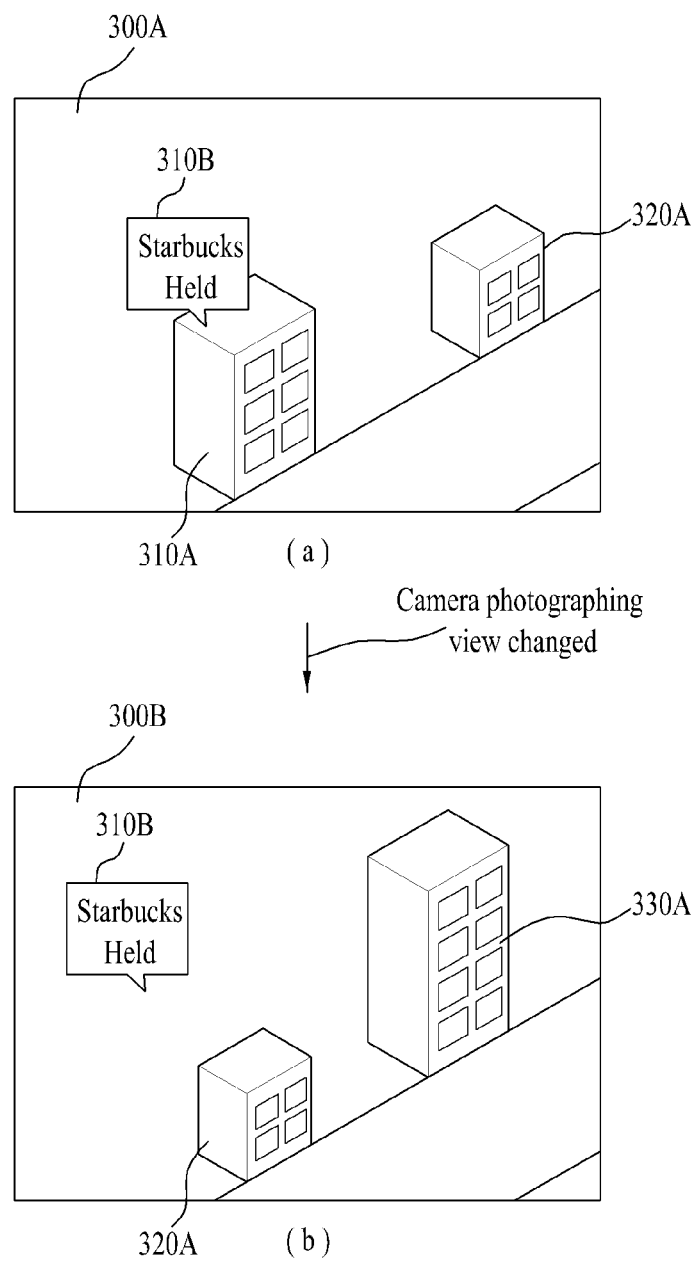
FIGS. 7(a) and 7(b) are diagrams of screen configurations of a process for selectively displaying a held object information among object informations within a preview image according to a first embodiment of the present invention.

FIG. 7 is a diagram of screen configurations of a process for selectively displaying a held object information among object informations within a preview image according to a first embodiment of the present invention.

First of all, as mentioned in the foregoing description with reference to FIG. 6 (*a*), while a first object information 310B on a first object 310A and a second object information 320B on a second object 320A are displayed in a first preview image 300A, if the first object information 310 is selected, the controller 180 holds the first object information 310B and stops displaying the rest of the object information 320B except the held first object information 310B in the first preview image 300A [FIG. 7 (*a*)].

While the first object information 310B is held by maintaining the user's touch, if the user's touch to the held first object information 310B is released, the controller 180 releases the holding of the first object information 310B in the first preview image 300A and is then able to re-display the first object information 310B on the first object 310A and the second object information 320B on the second object 320A in the first preview image 300A.

While the first object information 310B is held (i.e., the held state by the initial touch once) without maintaining the user's touch, if the held first object information 30B is touched, the controller 180 releases the holding of the first object information 310B in the first preview image 300A and is then able to re-display the first object information 310B on the first object 310A and the second object information 320B on the second object 320A in the first preview image 300A.

Referring to FIG. 7 (*b*), while the first object information 310B is held in the first preview image 300A, if a second preview image 300B generated from changing a photographing view of the camera 121 is displayed, the controller 180 does not display the second object information 320B on the second object 320A and a third object information 330B on a third object 330B but continues to display the held first object information 310B in the second preview image 300B.

Second Embodiment

A second embodiment of the present invention relates to a process for identifiably displaying a held object information among a plurality of object informations in a preview image.

Figure 8:
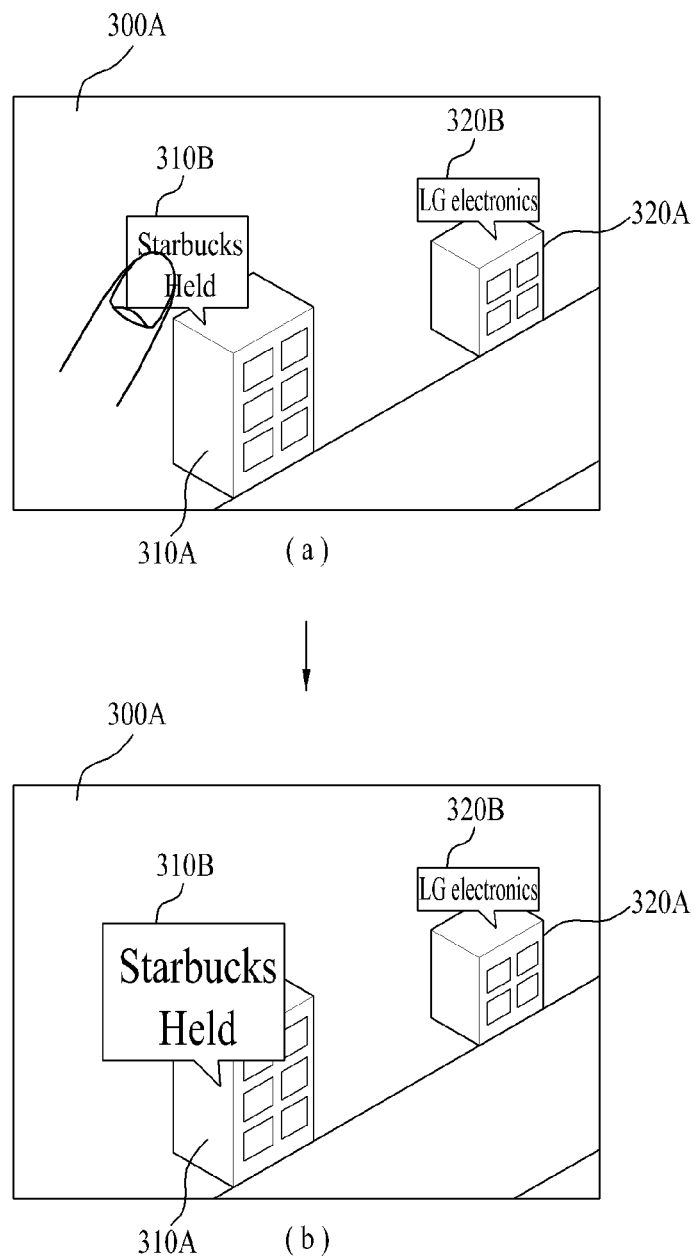
FIGS. 8(a) and 8(b) are diagrams of screen configurations of a process for identifiably displaying a held object information among object informations within a preview image according to a second embodiment of the present invention.

FIG. 8 is a diagram of screen configurations of a process for identifiably displaying a held object information among object informations within a preview image according to a second embodiment of the present invention.

Referring to FIG. 8 (*a*), while a first object information 310B on a first object 310A and a second object information 320B on a second object 320A are displayed in a first preview image 300A, if the first object information 310B is selected, the controller 180 holds the first object information 310B.

In this case, if the held first object information 310B is touched, referring to FIG. 8 (*b*), the controller 180 identifiably displays the held first object information 310B in the first preview image 300A by changing at least one of a font style, a color, a shape and the like of the held first object information 310B.

FIG. 8 (*b*) shows that the first object information 310B is identifiably displayed in the first preview image 300A in a manner of zoom-in.

In particular, if the held first object information 310B is displayed different from the second object information 320B that is not held, it is included in the second embodiment of the present invention.

Third Embodiment

A third embodiment of the present invention relates to a process for searching and displaying an object information related to a held object information among objects within a preview image.

Figure 9:
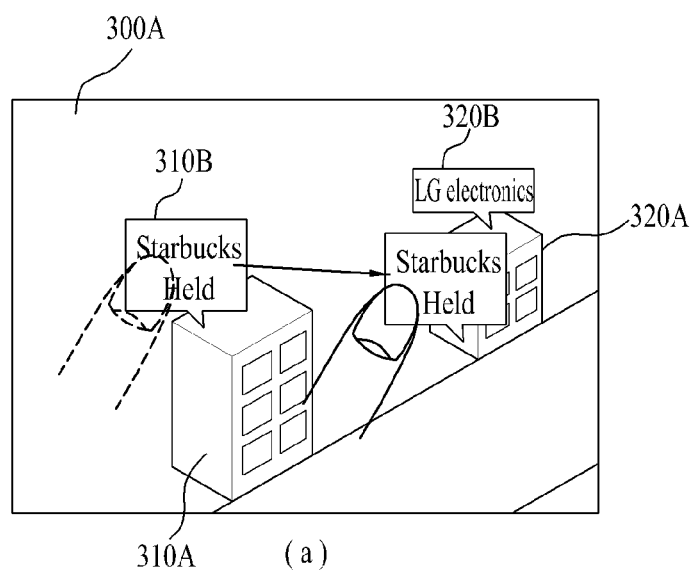
Figure 9:
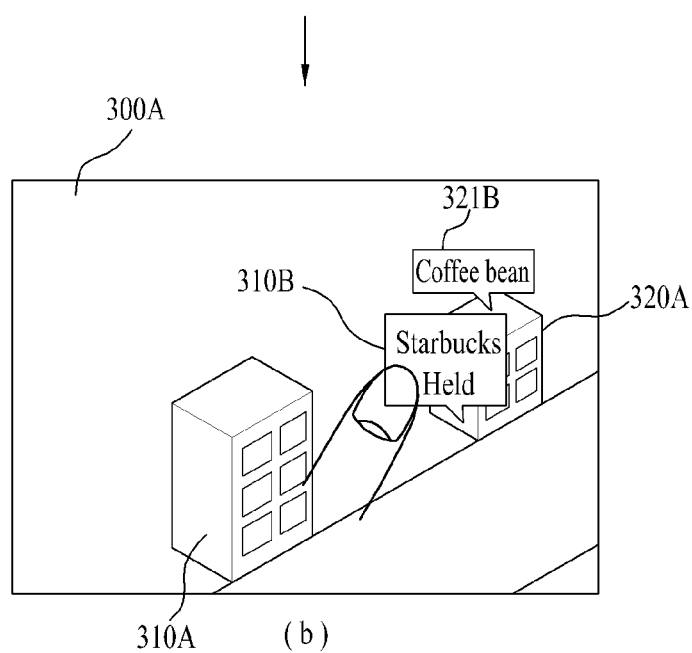
Figure 10:
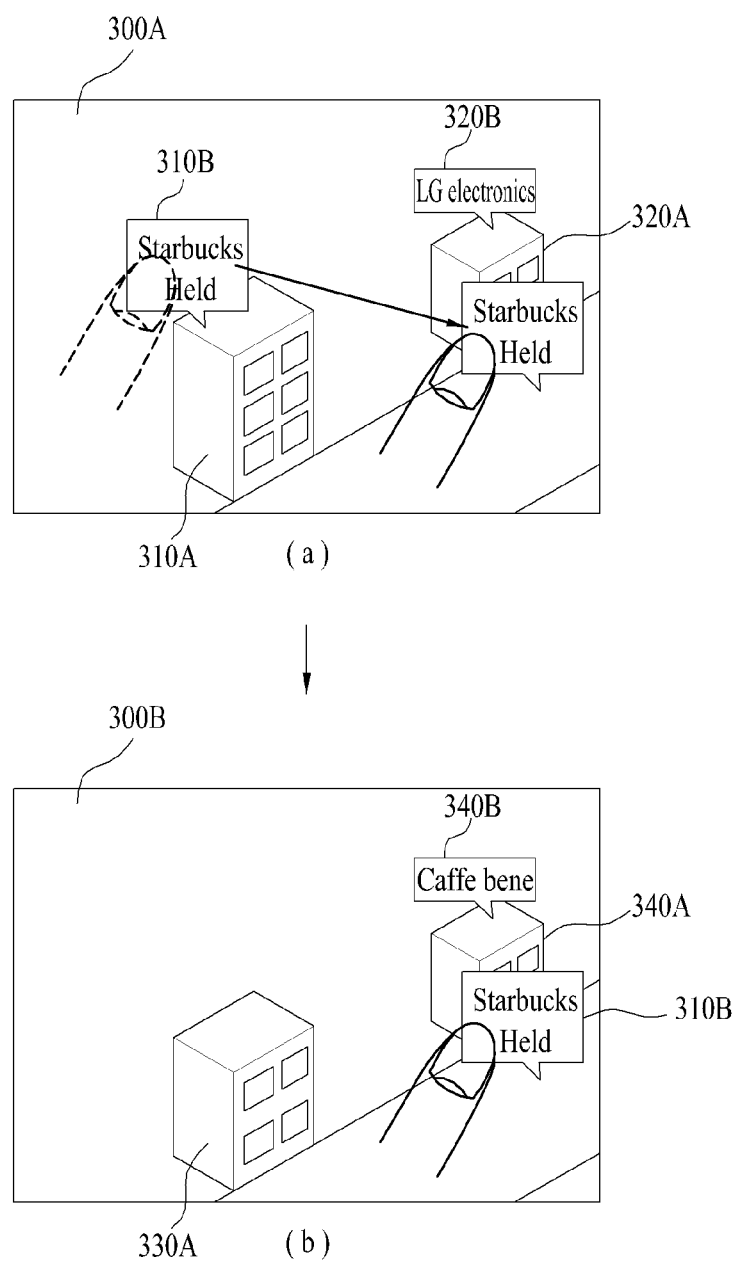

FIG. 9 and FIG. 10 are diagrams of screen configurations of a process for searching and displaying an object information related to a held object information among objects within a preview image according to a third embodiment of the present invention.

Referring to FIG. 9 (*a*), while a first object information 310B on a first object 310A and a second object information 320B on a second object 320A are displayed in a first preview image 300A, if the first object information 310B is selected, the controller 180 holds the first object information 310B.

In this case, if the held first object information 310B is shifted to the second object 320A according to a user's touch & drag, referring to FIG. 9 (*b*), the controller 180 searches for an object 321B (coffee bean) having a category related to the first object information 310B among the object informations in the second object 320A and then displays the found object information 321B (coffee bean).

Referring to FIG. 10 (*a*), after the held first object information 310B has been shifted by the user's touch & drag, as a photographing view of the camera 121 is changed, if the first preview image 300A is switched to a second preview image 300B, the controller 180 keeps displaying the held first object information 310B within the second preview image 300B.

Referring to FIG. 10 (*b*), if the held first object information 310B in the second preview image 300B is shifted to a fourth object 340A according to a user's touch & drag, the controller 180 searches for an object information 340B (Caffe bene) having a category related to the first object information 310B among object informations within the fourth object 340A and then displays the found object information 340B (Caffe bene).

Fourth Embodiment

A fourth embodiment of the present invention relates to a process for editing a held object information in a preview image.

FIGS. 11 to 14 are diagrams of screen configurations of a process for editing a held object information according to a fourth embodiment of the present invention.

Figure 11:
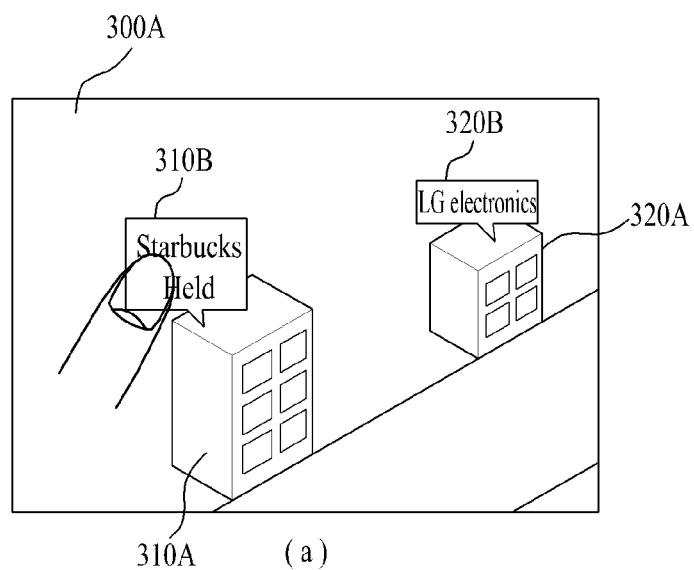
Figure 11:
Figure 11:
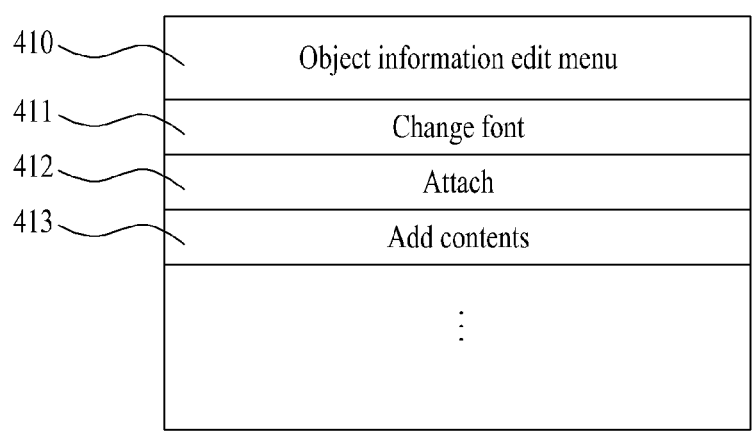

Referring to FIG. 11 (*a*), while a first object information 310B is held in a first preview image 300A, if a command for editing the held first object information 310B is inputted by a user, the controller 180 displays a menu 410 for editing the first object information 310B [FIG. 11 (*b*)].

In this case, FIG. 11 (*b*) shows one example that the editing menu 410 includes a font change submenu 411, an attachment submenu 412 and a content add submenu 413.

Of course, a type of the editing menu according to the fourth embodiment of the present invention is not limited by the above example. Namely, all menus for editing the first object information 310B are available for the fourth embodiment of the present invention.

If the font change submenu 411 is selected [FIG. 12 (*a*)], the controller 180 displays a user interface (hereinafter abbreviated UI) for changing a font style of the first object information 310B [FIG. 12 (*b*)].

Figure 12:
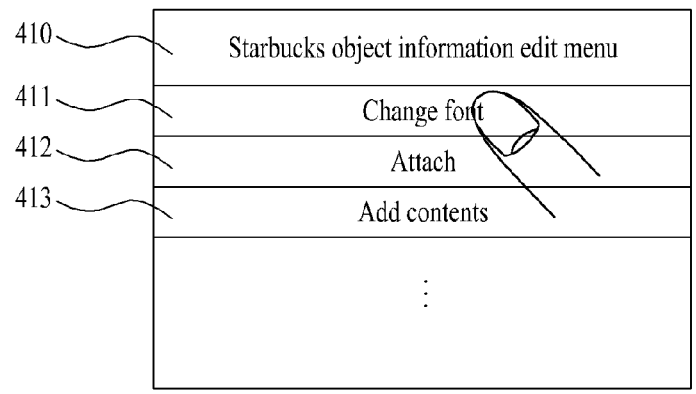
Figure 12:
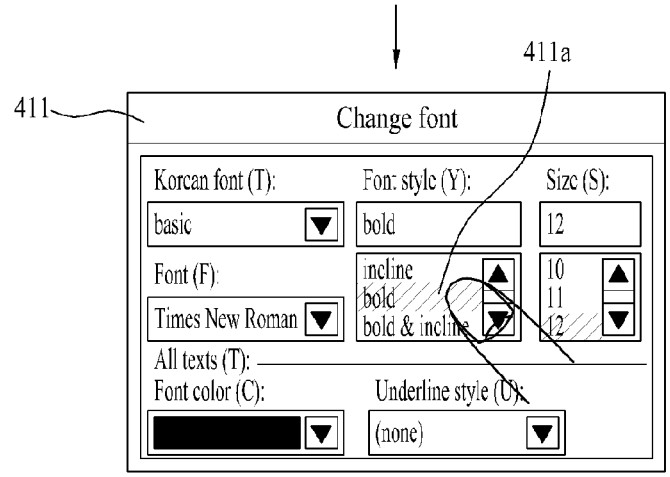
Figure 12:
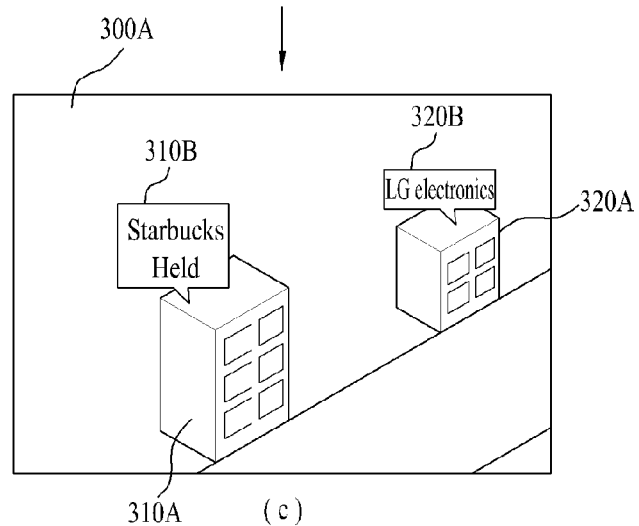

Once the font style 411*a* of the first object information 310B is changed via the font style change UI, the controller 180 applies the changed font style 411*a* to the first object information 310A and then displays the corresponding first object information 310B [FIG. 12 (*c*)].

Figure 13:
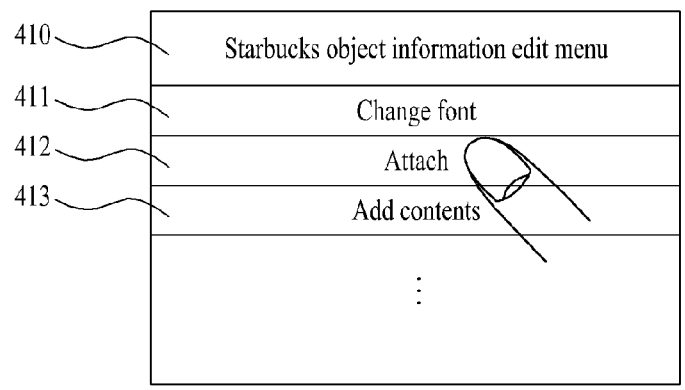
Figure 13:
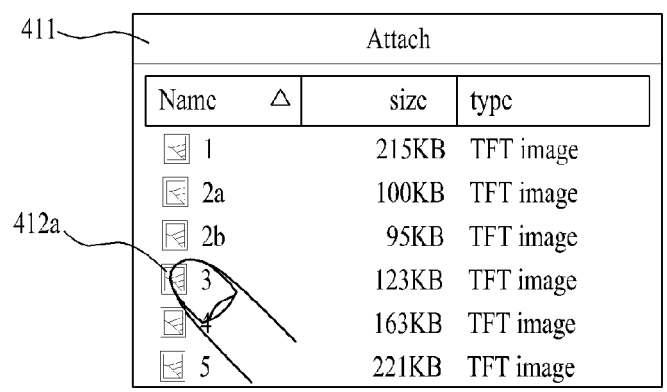
Figure 13:
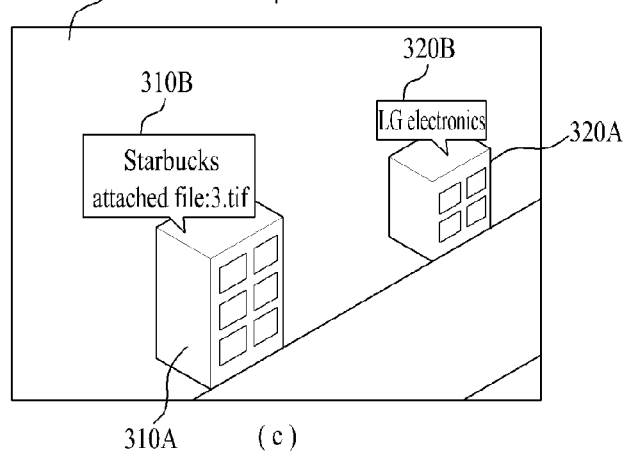

If the attachment submenu 412 is selected [FIG. 13 (*a*)], the controller displays a list of contents stored in the memory 160 [FIG. 13 (*b*)].

In this case, the contents include all data provided to the mobile terminal 100. And, the data include 'contact informations in a phonebook', 'sent and received messages', 'music files', 'video files', 'image files', 'schedule informations', 'document files', 'game files', 'webpage address files' and the like. Occasionally, the contents can include menus as well.

If the content 412*a* is selected from the content list to be attached to the first object information 310B, the controller 180 attaches the selected content 412*a* to the first object information 310B.

Figure 14:
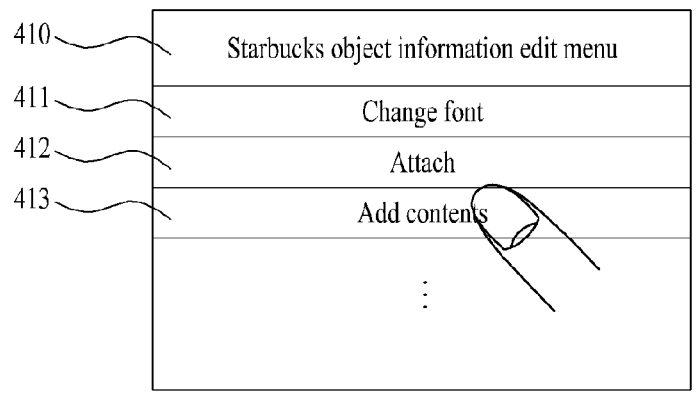
Figure 14:
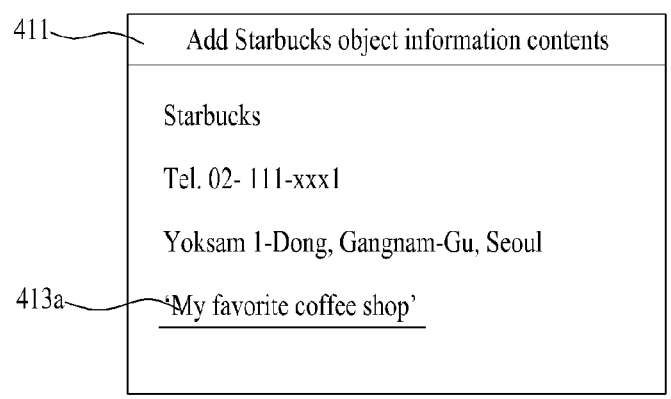
Figure 14:
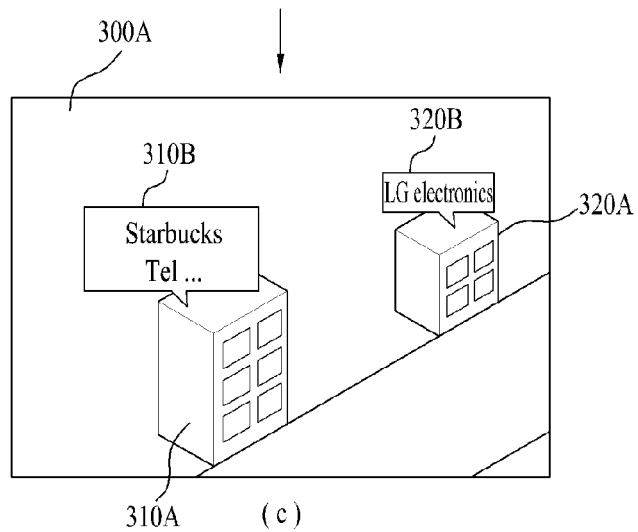

If the content add submenu 413 is selected [FIG. 14 (*a*)], the controller 180 displays a content of the first object information 310B on the screen [FIG. 14 (*b*)].

Afterwards, if an additional content 413*a* is written in the content of the first object information 310B by a user, the controller 180 controls the additional content 413*a* to be stored in the first object information 310B and then displays the first object information 310B containing the additional content 413*a* therein [FIG. 14 (*b*)].

Fifth Embodiment

A fifth embodiment of the present invention relates to a process for storing and displaying held object information per category in a preview image.

Figure 15:
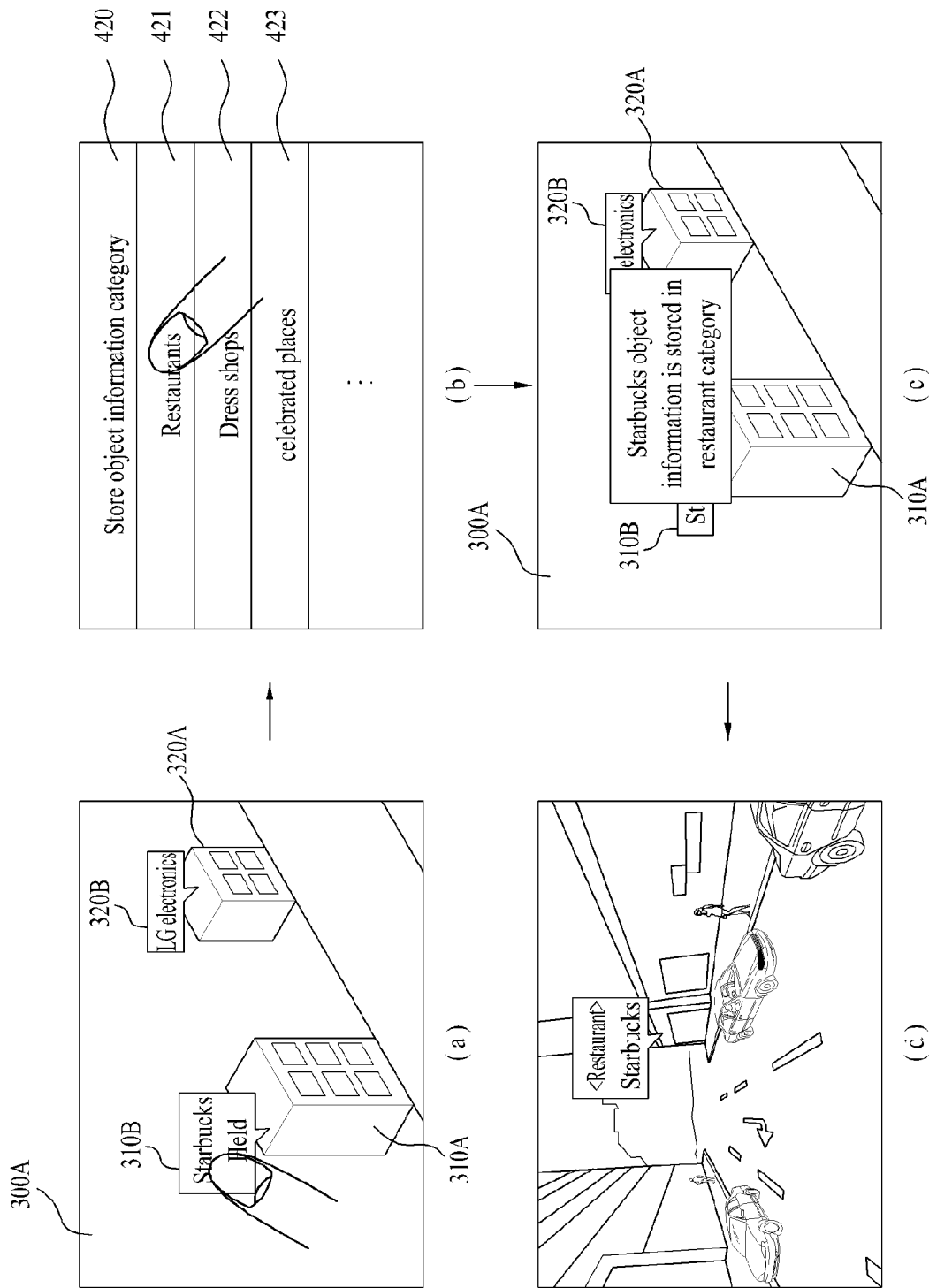
FIGS. 15(a) to 15(d) are diagrams of screen configurations of a process for storing and displaying a held object information per category according to a fifth embodiment of the present invention.

FIG. 15 is a diagram of screen configurations of a process for storing and displaying held object information per category according to a fifth embodiment of the present invention.

Referring to FIG. 15 (*a*), while a first object information 310B is held, if a command for storing the held first object information 310B is inputted by a user, the controller 180 displays a list 420 of a plurality of categories classified per category 421/422/423 of an object. [FIG. 15 (*b*)].

If a specific category 421 (restaurant) is selected from the category list 420, referring to FIG. 15 (*c*), the controller 180 stores the held first object information 310B in a storage place of the memory 160 corresponding to the selected category 421 (restaurant).

Afterwards, while the held first object information 310B is stored per category by the steps shown in FIG. 15 (*a*) and FIG. 15 (*b*), if a current position of the mobile terminal 100 approaches the first object 310A corresponding to the stored first object information 310B in a predetermined distance, referring to FIG. 15 (d), the controller 180 displays the stored first object information 310B.

In doing so, in the first object information 310B displayed by the step shown in FIG. 15 (d), information indicating the category 421 (restaurant), for which the first object information 310B is stored, can be stored in addition.

Sixth Embodiment

A sixth embodiment of the present invention relates to a process for attaching a held object information to a menu function set by a user.

Figure 16:
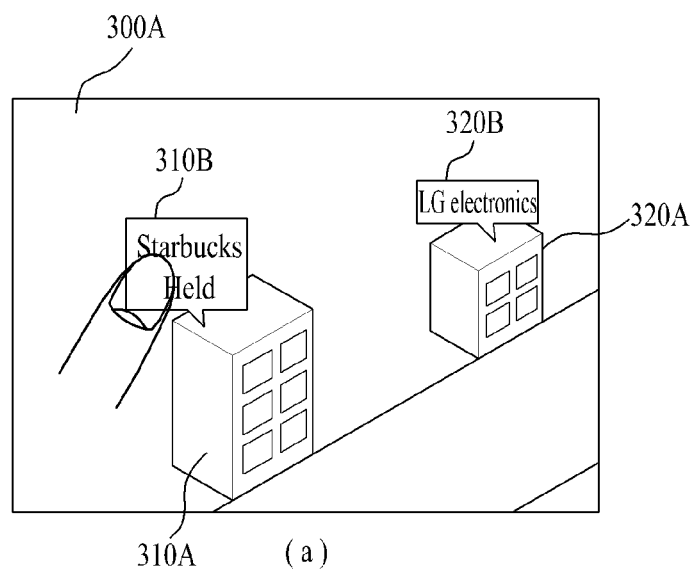
FIGS. 16(a) and 16(b) are diagrams of screen configurations of a process for attaching a held object information to a menu function set by a user according to a sixth embodiment of the present invention.
Figure 16:
Figure 16:
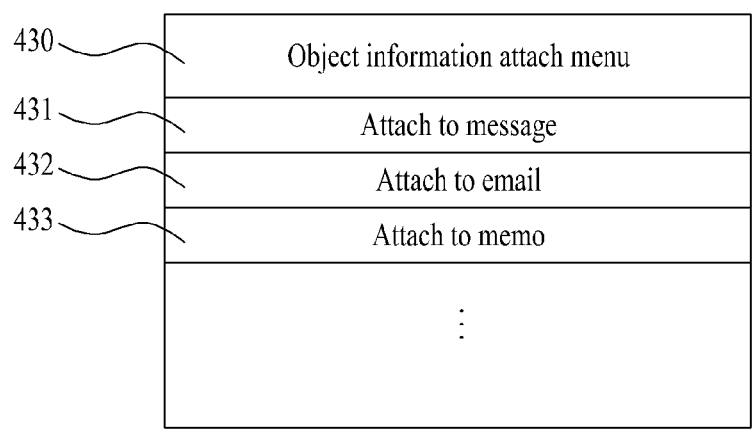

FIG. 16 is a diagram of screen configurations of a process for attaching a held object information to a menu function set by a user according to a sixth embodiment of the present invention.

Referring to FIG. 16 (a), while a first object information 310B is held, if a command for attaching the held first object information 310B is inputted by a user, the controller 180 displays a menu list 430 for attaching the held first object information 310B [FIG. 16 (b)].

In this case, a message attach function 431, an email attach function 432 and a memo attach function 433 can be included in the menu list 430.

If the message attach function 431 is selected from the menu list 430, the controller 180 displays a message write window and then attaches the held first object information 310B to the message write window.

After the held first object information 310B has been attached to the message write window, if a content of the message and a recipient contact address are inputted by a user, the controller 180 sends a message, to which the first object information 310B is attached, to the recipient via the wireless communication unit 110.

If the email attach function 432 is selected from the menu list 430, the controller 180 displays an email write window and then attaches the held first object information 310B to the email write window.

After the held first object information 310B has been attached to the email write window, if a content of the email and an email address of a recipient are inputted by a user, the controller 180 sends an email, to which the first object information 310B is attached, to email address of the recipient via the wireless communication unit 110.

If the memo attach function 433 is selected from the menu list 430, the controller 180 displays a memo write window and then stores it by attaching the held first object information 310B to the memo write window.

If the memo attach function 433 is selected from the menu list 430, the controller 180 displays a previously stored memo list. If a specific memo is selected from the previously stored memo list, the controller 180 is able to store the selected memo by attaching the held first object information 310B to the selected memo.

Seventh Embodiment

A seventh embodiment of the present invention relates to a process for photographing and storing a preview image including a held object information.

Figure 17:
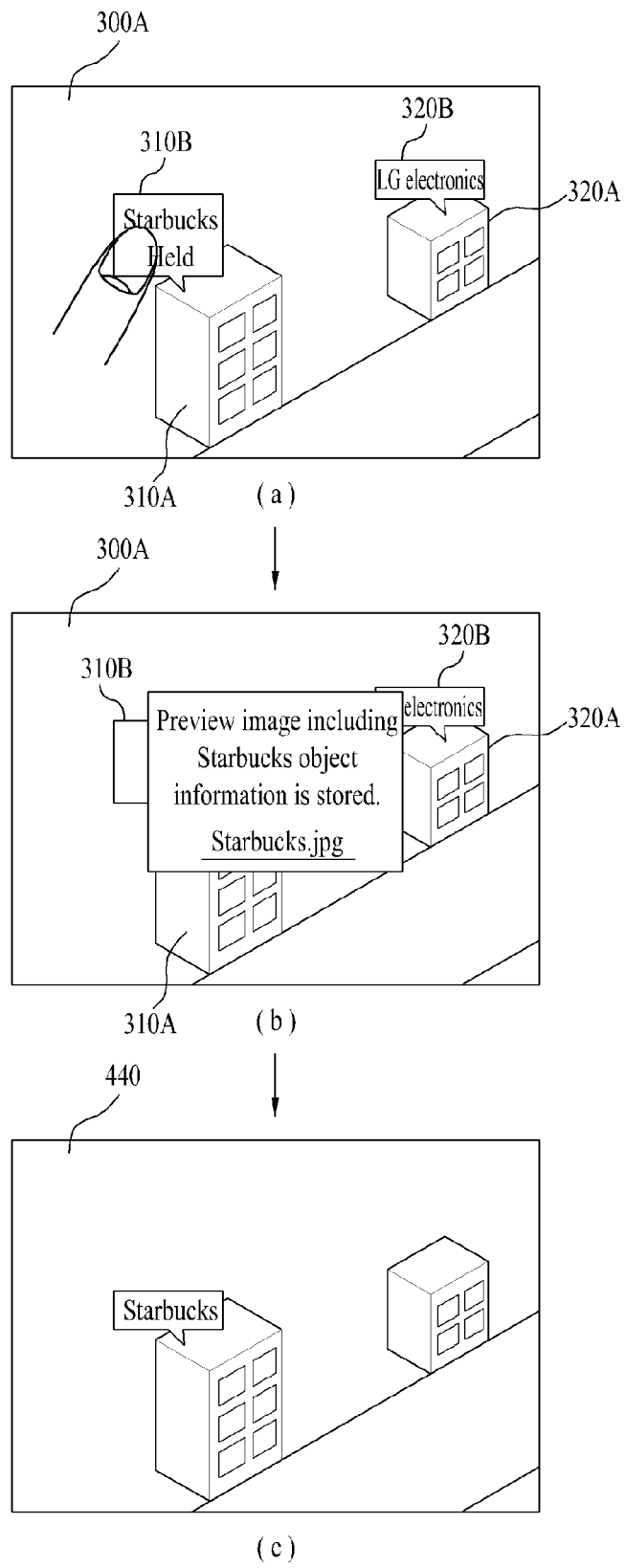
FIGS. 17(a) to 17(c) are diagrams of screen configurations of a process for photographing and storing a preview image including a held object information according to a seventh embodiment of the present invention.

FIG. 17 is a diagram of screen configurations of a process for photographing and storing a preview image including a held object information according to a seventh embodiment of the present invention.

Referring to FIG. 17 (a), while a first object information 310B is held, if a command for photographing a first preview image 300A including the held first object information 310B is inputted by a user, the controller 180 controls the first preview image 300A including the held first object information 310B to be stored as a file 440 of a still or moving picture in the memory 160 [FIG. 17 (b)].

In doing so, when the photographed first preview image 300A is stored together with the held first object information 301B, referring to FIG. 17 (c), the controller 180 is able to store the first object information 310B in a manner of synthesizing the first object information 310B with the photographed first preview image 300A.

Moreover, when the photographed first preview image 300A is stored together with the held first object information 301B, the controller 180 is able to store the first object information 310B in a manner of linking the first object information 310B and the photographed first preview image 300A to each other despite separating them from each other.

When a file corresponding to the stored first preview image 300A is executed and displayed, the controller 180 is able to display both of the stored first preview image 300A and the linked first object information 310B together.

Eighth Embodiment

An eighth embodiment of the present invention relates to a process for displaying a preview image including a held object information as a thumbnail.

Figure 18:
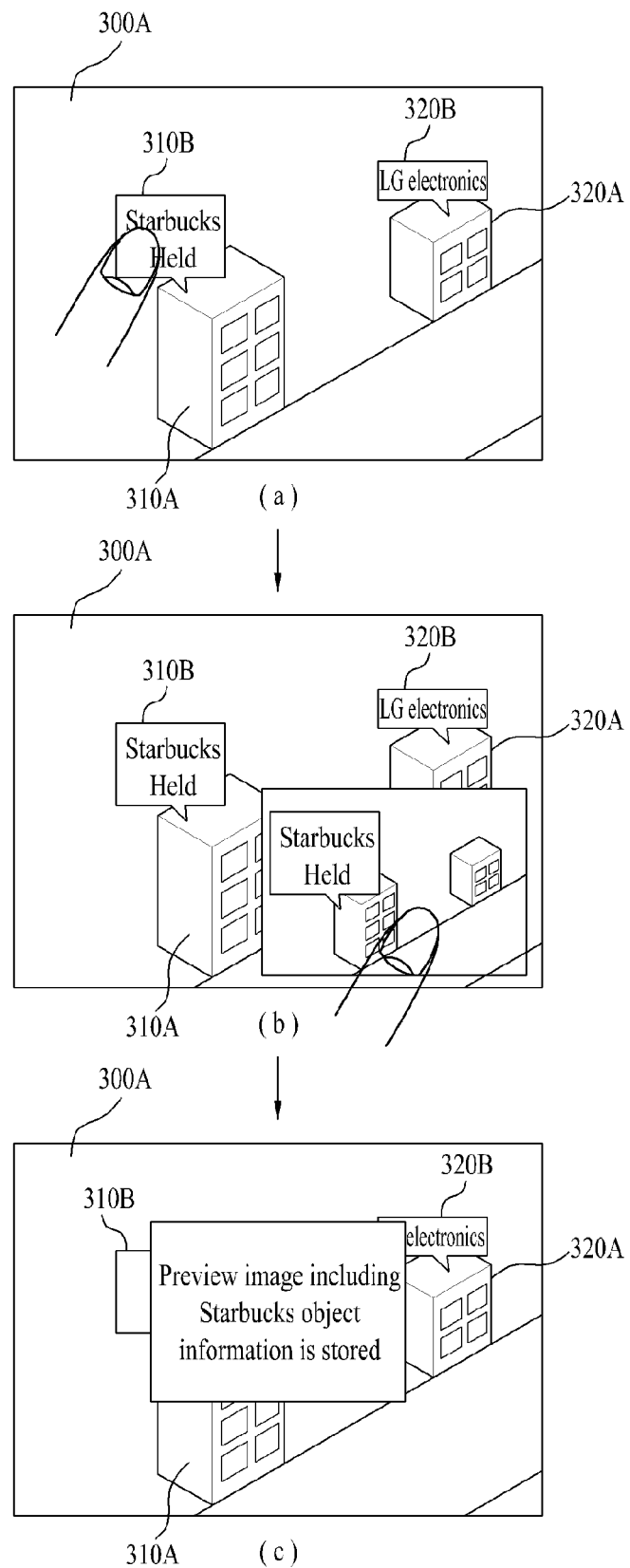
FIGS. 18(a) to 18(c) are diagrams of screen configurations of a process for displaying a preview image including a held object information as a thumbnail according to an eighth embodiment of the present invention.

FIG. 18 is a diagram of screen configurations of a process for displaying a preview image including a held object information as a thumbnail according to an eighth embodiment of the present invention.

Referring to FIG. 18 (a), if a first object information 310B is held within a first preview image 300A, the controller 180 displays a preview image 450, in which the held first object information 310B is included, as a thumbnail in a first preview image 300A before holding the first object information 310B [FIG. 18 (b)].

In particular, a user is able to determine whether to photograph the preview image 450 while previewing the preview image 450 having the first object information 310 of the thumbnail type included therein.

If a command for storing the preview image 450 having the thumbnail type first object information 310 included therein is inputted, referring to FIG. 18 (c), the controller 180 photographs the preview image 450 including the first object information 310B therein and then stores it as a file in the memory 160.

In particular, if the thumbnail type preview image 450 is touched, the controller 180 photographs the preview image 450 including the first object information 310B therein and then stores it as a file in the memory 160.

Moreover, if the first preview image 300A before holding the first object information 310B is touched, the controller 180 photographs the preview image 300A not including the first object information 310B therein and then stores it as a file in the memory 160.

Ninth Embodiment

A ninth embodiment of the present invention relates to a process for displaying an original preview image and a preview image including a held object information.

Figure 19:
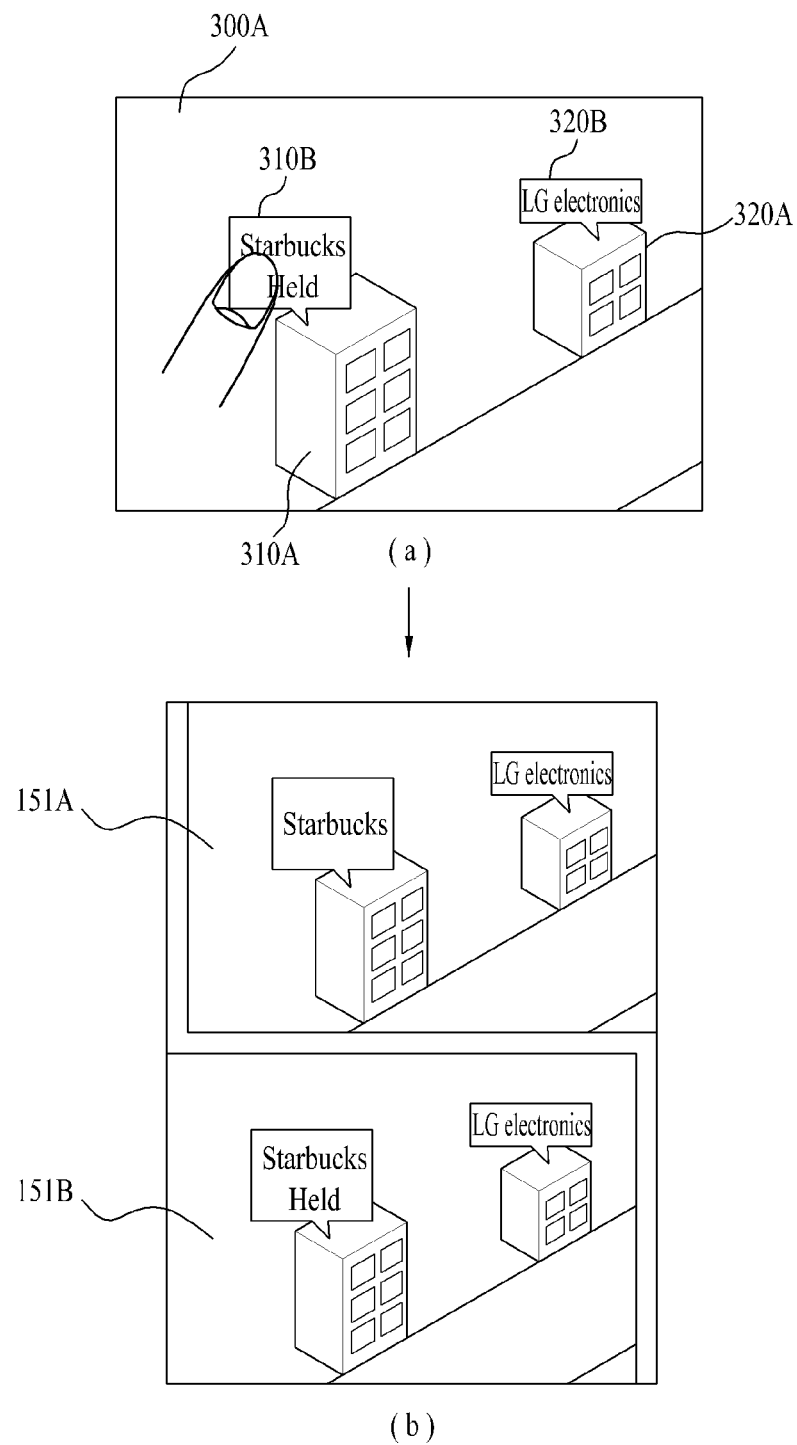
FIGS. 19(a) and 19(b) are diagrams of screen configurations of a process for displaying an original preview image and a preview image including a held object information according to a ninth embodiment of the present invention.

FIG. 19 is a diagram of screen configurations of a process for displaying an original preview image and a preview image including a held object information according to a ninth embodiment of the present invention.

Referring to FIG. 19 (a), if a first object information 310B is held within a first preview image 300A, the controller 180 partitions a screen of the touchscreen 151 into a plurality of regions (e.g., a first region 151A and a second region 151B) [FIG. 19 (b)].

Afterwards, the controller 180 displays a preview image before holding the first object information 310B in the first region 151A and also displays a preview image including the held first object information 310B in the second region 151B.

In particular, while viewing the first and second regions 151A and 151B, a user compares the preview image before holding the first object information 310B and the preview image including the held first object information 310B to each other and is also able to photograph the preview images.

In this case, if a command for storing the preview image in one of the first and second regions 151A and 151B is inputted, the controller 180 photographs the preview images displayed in the first and second regions 151A and 151B respectively and is then able to store them as filed in the memory, respectively.

In particular, if the first region 151A is touched, the controller 180 photographs the first preview image 300A displayed in the first region 151a and then stores it as a file in the memory 160.

If the second region 151B is touched, the controller 180 photographs the preview image including the held object information 310B and then stores it as a file in the memory 160.

Tenth Embodiment

A tenth embodiment of the present invention relates to a process for transmitting an object information held in a preview image to a counterpart contact address.

Figure 20:
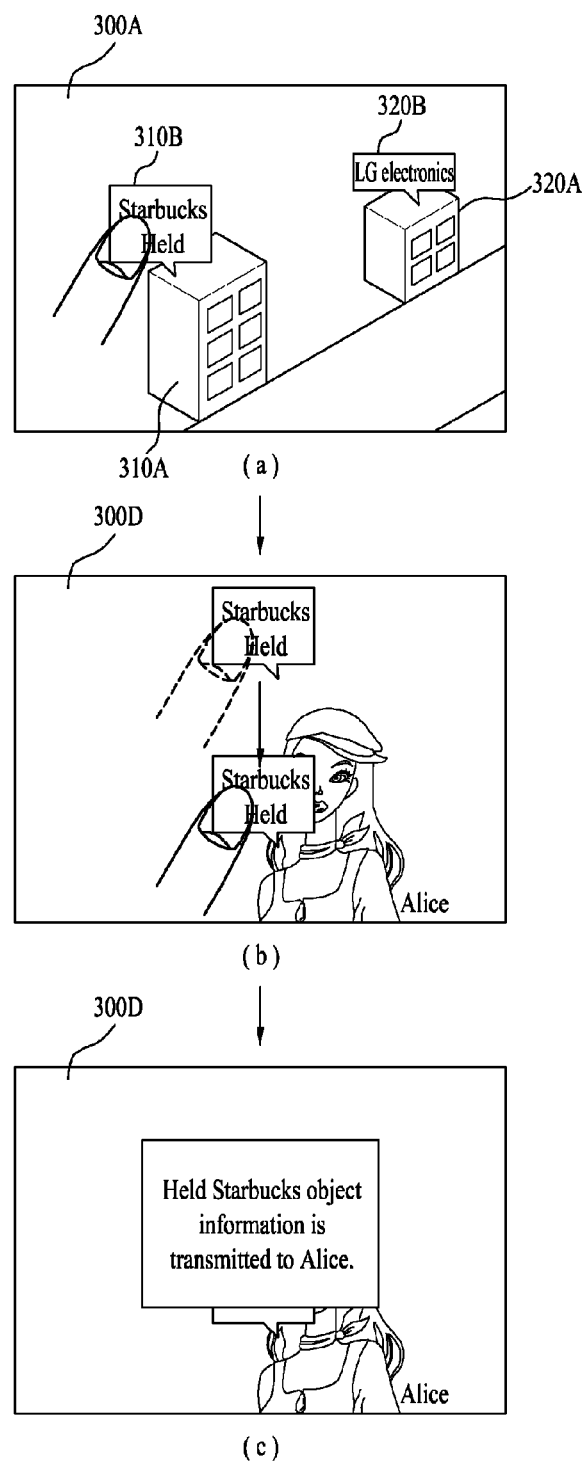
Figure 21:
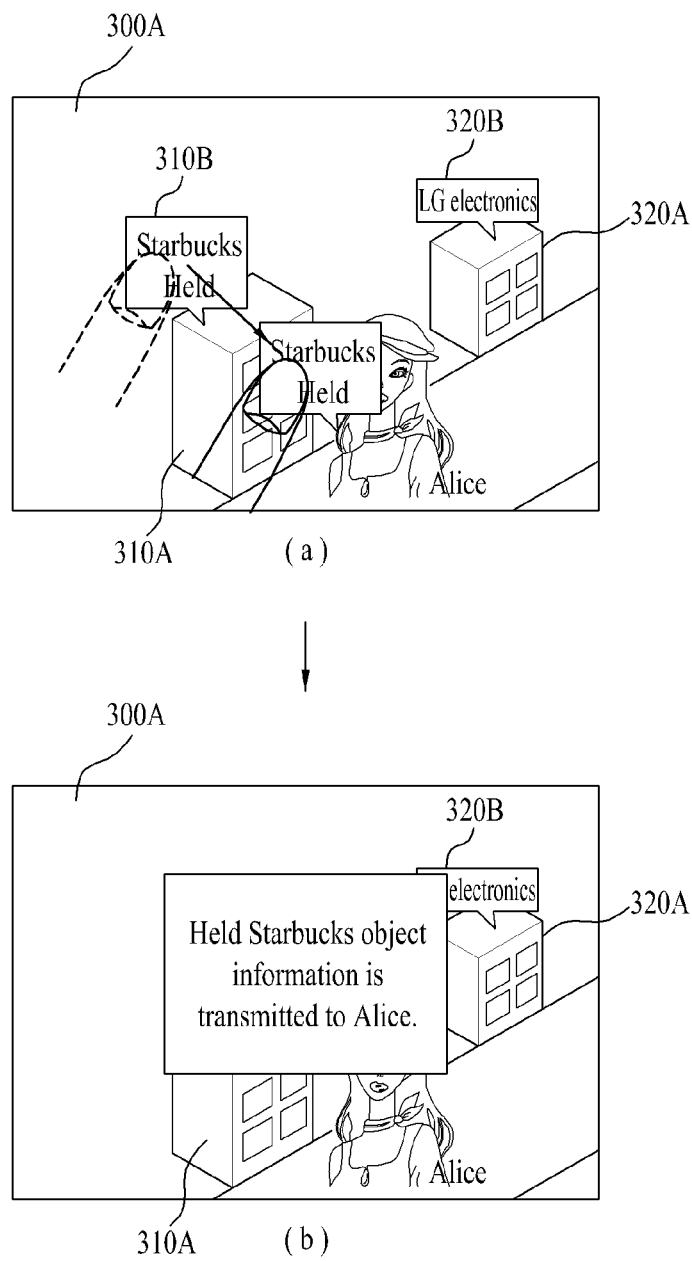
Figure 22:
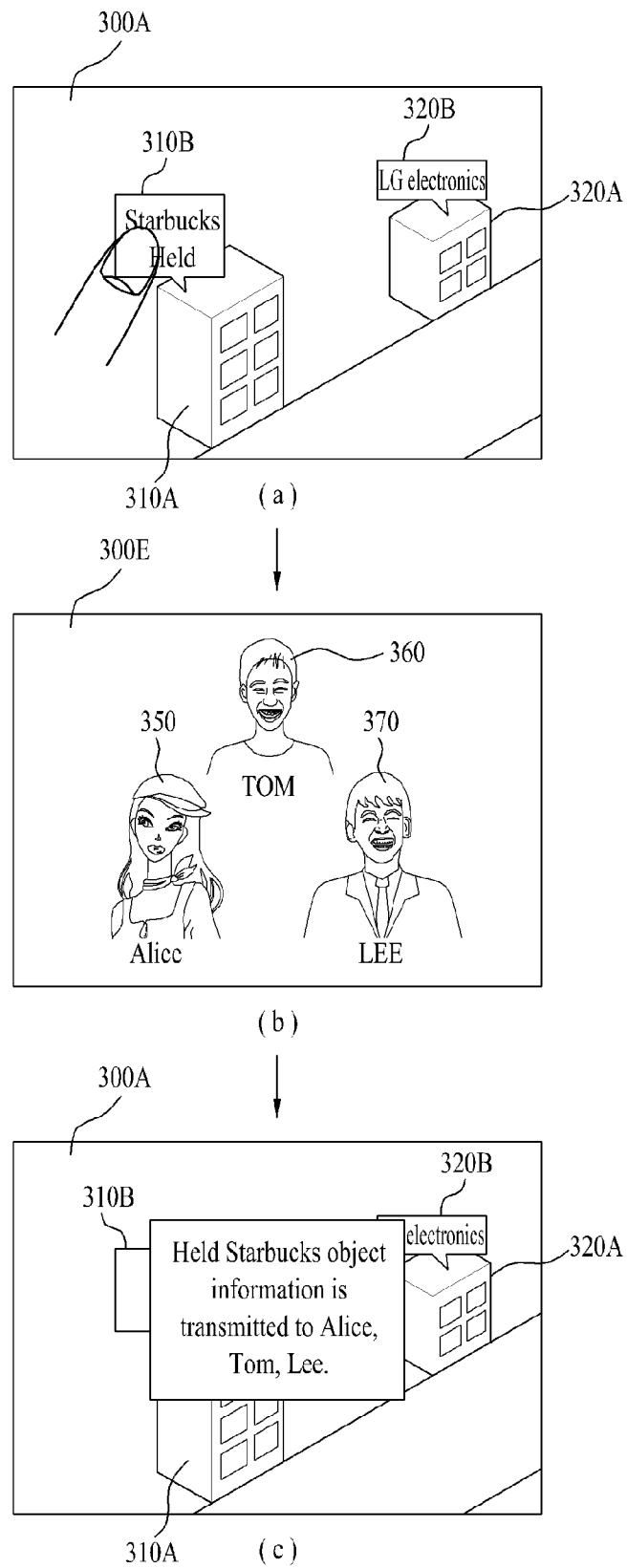

FIGS. 20 to 22 are diagrams of screen configurations of a process for transmitting a held object information to a counterpart contact address according to a tenth embodiment of the present invention.

Referring to FIG. 20 (a), while holding a first object information 310B in a first preview image 300A, as a photographing view of the camera 121 is changed so that the first preview image 300A is switched to a fourth preview image 300D, the controller 180 keeps displaying the held object information 310B in the fourth preview image 300D.

If the held first object information 310B is shifted to a first counterpart picture 350 (Alice) according to a user's touch & drag, the controller 180 recognizes a pattern of the first counterpart picture 350 (Alice). In doing so, the controller 180 is able to recognize the pattern of the first counterpart picture 350 (Alice) in the fourth preview image 300D using general object tracking algorithm.

Once the pattern of the first counterpart picture 350 (Alice) in the fourth preview image 300D is recognized, the controller 180 searches contact informations provided to the memory 160 for the contact information having a picture image corresponding to the recognized pattern of the first counterpart picture 350 (Alice).

If the picture image corresponding to the recognized pattern of the first counterpart picture 350 (Alice) is found from the memory 160, referring to FIG. 20 (c), the controller 180 transmits the held first object information 310B to a contact of the found first counterpart picture 350 (Alice) via the wireless communication unit 110.

In doing so, if the contact information is found, the controller 180 is able to display a transmission type list for inquiring a user of a transmission type of the first object information 310B.

In this case, the transmission type list can include one of a message transmission, an email transmission, a short range communication and the like.

In particular, if a user selects the message transmission type from the transmission type list, the controller 180 sends a message including the first object information 310B to a phone number of the first counterpart (Alice) using the mobile communication module 112 of the wireless internet module 113.

If a user selects the email transmission type from the transmission type list, the controller 180 sends a message including the first object information 310B to an email address of the first counterpart (Alice) using the wireless internet module 113.

If a user selects the short range communication type from the transmission type list, the controller 180 sends the first object information 310B to a terminal of the first counterpart (Alice) using the short-range communication module 114.

Referring to FIG. 21 (a), while holding a first object information 310B in a first preview image 300A, if the held first object information 310B is shifted to a first counterpart picture 350 (Alice) within the first preview image 300A, the controller 180 searches the memory 160 for contact information having the picture image corresponding to a pattern of the first counterpart picture 350 (Alice).

If the picture image corresponding to the recognized pattern of the first counterpart picture 350 (Alice) is found from the memory 160, referring to FIG. 21 (b), the controller 180 transmits the held first object information 310B to a contact of the found first counterpart picture 350 (Alice) via the wireless communication unit 110.

Referring to FIG. 22 (a), while holding a first object information 310B in a first preview image 300A, as a photographing view of the camera 121 is changed, if the first preview image 300A is switched to a fifth preview image 300E, the controller 180 recognizes patterns of first to third counterpart pictures 350, 360 and 370 (Alice, Tom, Lee) existing in the fifth preview image 300E.

If the patterns of the first to third counterpart pictures 350, 360 and 370 (Alice, Tom, Lee) are recognized from the fifth preview image 300E, the controller 180 searches the contact informations provided to the memory 160 for contact informations having picture images corresponding to the recognized patterns of the first to third counterpart pictures 350, 360 and 370 (Alice, Tom, Lee).

If the contact informations respectively having the picture image corresponding to the recognized patterns of the first to third counterpart pictures 350, 360 and 370 (Alice, Tom, Lee) are found from the memory 160, referring to FIG. 22 (c), the controller transmits the held first object information 310B to contacts of the found first to third counterpart pictures 350, 360 and 370 (Alice, Tom, Lee), respectively.

Accordingly, the present invention provides the following effects and/or advantages.

First of all, according to at least one of embodiments of the present invention, a user enables object information on an object in a preview image to be held in the preview image and is then able to utilize the held object information in various ways.

It will be apparent to those skilled in the art that various modifications and variations can be specified into other forms without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a wireless communication unit;
    a camera configured to generate a preview image;
    a position information unit configured to obtain a current position of the mobile terminal;
    a touchscreen configured to display the generated preview image; and
    a controller configured to:
        search for object information related to at least one object in the preview image based on the current position of the mobile terminal;
        control the touchscreen to display the object information;
        control the touchscreen to hold the object information within the preview image if the object information is selected; and
        control the touchscreen to display the preview image including the held object information as a thumbnail if the object information is held, the thumbnail displayed within the preview image as it existed prior to holding the object information.

2. The mobile terminal of claim 1, wherein the controller is further configured to control the touchscreen to maintain the display of the object information within the preview image until performing an operation related to the held object information if the object information is selected.

3. The mobile terminal of claim 1, wherein the controller is further configured to:
    control the touchscreen to maintain the display of the held object information as a photographing view of the camera is changed if an object corresponding to the held object information does not exist in the preview image;
    control the touchscreen to hold the selected object information and stop displaying the rest of the object information that is not held when one of at least two object information displayed in the preview is selected; or
    control the touchscreen to display the held object information in the preview image such that the held object information is emphasized.

4. The mobile terminal of claim 1, wherein:
    held object information is shiftable according to a user's touch and drag operation within the preview image; and
    the controller is further configured to control the touchscreen to display object information on an object having a category related to the held object information each time the held object information passes over one of a plurality of objects within the preview image in response to the touch and drag operation.

5. The mobile terminal of claim 1, wherein the controller is further configured to:
    control the touchscreen to display an edit menu window for editing the held object information; and
    store the edited object information if the held object information is edited via the edit menu window.

6. The mobile terminal of claim 1, wherein the controller is further configured to control a plurality of storage locations classified according to a category of an object to be displayed if a command for storing the held object information is received.

7. The mobile terminal of claim 6, wherein the controller is further configured to control the touchscreen to display stored object information in the preview image while the object information is stored according to the category and the current position of the mobile terminal approaches within a predetermined distance of an object corresponding to the stored object information.

8. The mobile terminal of claim 1, wherein the controller is further configured to control the touchscreen to attach the held object information to a menu function selected by a user if the object information is held.

9. The mobile terminal of claim 8, wherein the menu function to which the held object information is attached comprises at least a menu write menu, an email write menu or a memo write menu.

10. The mobile terminal of claim 1, wherein the controller is further configured to store the preview image including the object information while the object information is held if a command for photographing the preview image is received.

11. The mobile terminal of claim 10, wherein the controller is further configured to store the held object information by synthesizing the held object information within the photographed preview image.

12. The mobile terminal of claim 10, wherein the controller is further configured to store the photographed preview image and the held object information as separate files, by linking the preview image and the held object information to each other.

13. The mobile terminal of claim 12, wherein the controller is further configured to control the touchscreen to display both the stored preview image and the linked object information together when the stored preview image is executed.

14. The mobile terminal of claim 1, wherein the controller is further configured to:
    control the camera to photograph the preview image including the held object information if the displayed thumbnail image is selected; and
    store the photographed preview image.

15. The mobile terminal of claim 1, wherein:
    the controller is further configured to display a new preview image if the preview image is changed to the new preview image by changing a photographing view of the camera, the new preview image including the held object information, a new object and new object information; and
    a category of the new object information is related to a category of the held object information.

16. A mobile terminal comprising:
    a wireless communication unit;
    a camera configured to generate a preview image;
    a position information unit configured to obtain a current position of the mobile terminal;
    a touchscreen configured to display the generated preview image; and a controller configured to:
  search for object information related to at least one object in the preview image based on the current position of the mobile terminal;
  control the touchscreen to display the object information;
  control the touchscreen to hold the object information within the preview image if the object information is selected;
  control the touchscreen such that the touchscreen is partitioned into a first region and a second region if the object information is held;
  control the touchscreen to display the preview image in the first region as it existed prior to holding the object information; and
  control the touchscreen to display the preview image including the held object information in the second region.

17. A mobile terminal, comprising:
a wireless communication unit;
a camera configured to generate a preview image;
a position information unit configured to obtain a current position of the mobile terminal;
a touchscreen configured to display the generated preview image; and
a controller configured to:
  search for object information related to at least one object in the preview image based on the current position of the mobile terminal;
  control the touchscreen to display the object information;
  control the touchscreen to hold the object information within the preview image if the object information is selected; and
  control the wireless communication unit to transmit the held object information to be transmitted to a contact of a selected different object while the object information is held and the different object within the preview image is selected.

18. The mobile terminal of claim 17, wherein:
the different object is located within the preview image including the held object information or is located within the preview image not including the held object information due to a changed photographing view of the camera;
the controller is further configured to control the wireless communication unit to transmit the held object information to the different object if the held object information is touched and dragged to the different object; or
the controller is further configured to recognize a picture of a selected counterpart included in the different object and transmit the held object information to a contact set in the recognized picture.

19. A mobile terminal, comprising:
a wireless communication unit;
a camera configured to generate a preview image;
a position information unit configured to obtain a current position of the mobile terminal;
a touchscreen configured to display the generated preview image; and
a controller configured to:
  search for object information related to at least one object in the preview image based on the current position of the mobile terminal;
  control the touchscreen to display the object information;
  control the touchscreen to hold the object information within the preview image if the object information is selected; and
  recognize a pattern of at least one new object displayed in the preview image while the object information is held as a photographing view of the camera is changed; and
  control the wireless communication unit to transmit the held object information to a contact previously set in the recognized pattern of the new object.

20. A method of controlling a mobile terminal, the method comprising:
displaying a preview image generated via a camera;
obtaining a current position of the mobile terminal;
searching for object information related to at least one object in the preview image based on the current position of the mobile terminal;
displaying the object information within the preview image;
holding selected object information within the preview image if the displayed object information is selected from within the preview image; and
displaying the preview image including the held object information as a thumbnail, the thumbnail displayed within the preview image as it existed prior to holding the object information.

* * * * *